UNITED STATES PATENT OFFICE.

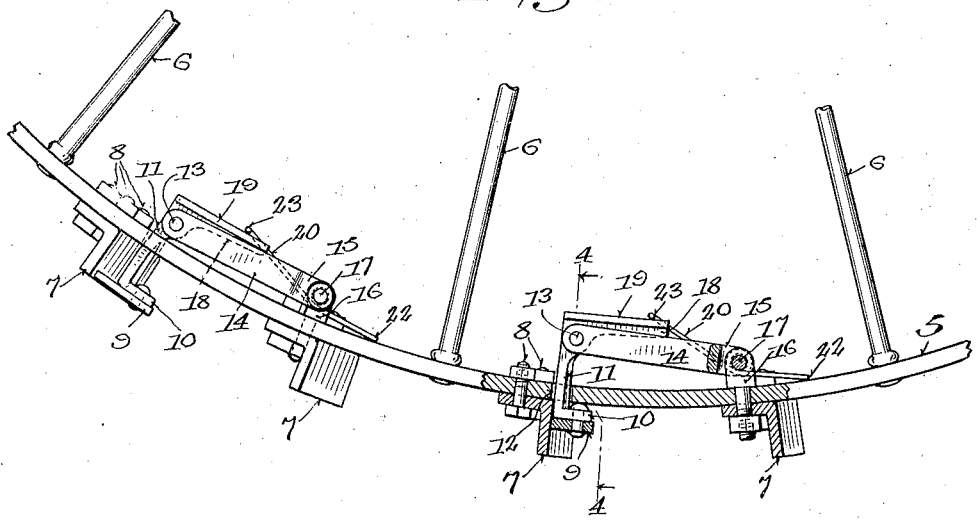

FRANK M. HEINIG, OF WATERTOWN, WISCONSIN.

TRACTION-WHEEL.

1,333,074.  Specification of Letters Patent.  Patented Mar. 9, 1920.

Application filed May 27, 1919. Serial No. 300,092.

*To all whom it may concern:*

Be it known that I, FRANK M. HEINIG, a citizen of the United States, and resident of Watertown, in the county of Jefferson and State of Wisconsin, have invented new and useful Improvements in Traction - Wheels, of which the following is a description, reference being had to the accompanying drawings, which are a part of this specification.

The present invention relates to certain new and useful improvements in traction wheels and refers more particularly to the traction wheel teeth construction.

The primary object of this invention is to provide means coöperating with the traction wheel teeth to free the same from dirt, mud or other foreign matter which may cling to the teeth.

My invention has for a further object to provide a traction wheel tooth cleaning device which is urged to operating position at all times.

With the above and other objects in view, which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention, constructed according to the best mode I have so far devised for the practical application of the principles thereof, and in which:

Figure 1 is a view of a portion of the rim and spokes of a traction wheel, said view having parts broken away and in section to more clearly illustrate the structural details of my invention.

Fig. 2 is a plan view of the inner surface of a portion of a wheel rim with my invention attached thereto.

Fig. 3 is a view similar to Fig. 2 of the outer surface of the rim, and

Fig. 4 is a sectional view taken transversely through the rim on the line 4—4 of Fig. 1.

Referring now more particularly to the accompanying drawing in which 5 designates a traction wheel rim having the usual inwardly extending spokes 6 and secured to the outer peripheral surface of the rim 5 is a plurality of spaced-apart traction teeth 7, said teeth being right angular in cross section and secured to the rim by means of bolts 8.

My invention consists of a movable plate 9, positioned alongside one of the teeth 7 and carried by the flanged outer end 10 of a bell crank lever 11 which extends inwardly through an opening 12 in the rim adjacent said tooth. The bell crank lever 11 has pivoted at its apex as at 13 one end of a bar or link 14 which has its other end bifurcated as at 15 and secured in the eye of an eye-bolt 16 by means of a pivot pin 17, and said eye-bolt passing through the rim 5 and assisting in securing the adjacent tooth 7 to the rim. As best shown in Fig. 4, the free arm 18 of the bell crank lever is flanged to provide a shoulder 19 adapted to abut bar 14 when the plate 9 is at its outer limit of movement juxtaposed the outer edge of the adjacent tooth 7. For yieldingly urging the plate 10 to its outer limit of movement, I provide a spring 20 which has its intermediate portion coiled about the pivot 17 of the bar 14 as at 21 and then extended in opposite directions, one end 22 bearing against the rim 5 and the other end being bent as at 23 and bearing upon the arm 18 of the bell crank lever near its end, the spring 20 being so constructed as to normally urge the bell crank lever toward the rim 5 as best illustrated in Fig. 1.

While I have only described one movable tooth or plate 9 associated with one tooth 7, it will be understood that as many of said devices may be carried by the traction wheel as desired.

From the foregoing description taken in connection with the accompanying drawing, it will be readily apparent that the operation of my device is as follows: As the portion of the rim 5 carrying one of my devices engages the ground, the spring 20 will be overcome and the plate 9 moved inwardly, and as that portion of the rim carrying the device disengages from the ground, the spring 20 will immediately urge the plate 9 to its outer limit of movement through its connections hereinbefore described, and consequently any mud or other foreign matter adhering to the adjacent tooth 7 will be removed and thus the proper traction means is assured at all times.

What I claim as my invention is:

1. A traction wheel tooth clearing device comprising a movable tooth engaging one face of a fixed tooth secured to a wheel rim, and means normally urging the movable tooth to a position adjacent the outer end of the fixed tooth, said movable tooth being movable inwardly under pressure.

2. The herein described traction wheel having an opening through its rim, a fixed tooth secured to the rim juxtaposed the opening, a movable tooth having its shank passed through the opening and movable against one face of said fixed tooth, and means normally urging the movable tooth to a position adjacent the outer end of the fixed tooth.

3. The herein described traction wheel having an opening through its rim, a fixed tooth secured to the rim juxtaposed the opening, a movable tooth having its shank passed through the opening, a bar having one end pivotally connected with the inner periphery of the rim and its other end pivotally connected with the shank of the movable tooth, and means engageable with said bar and tooth shank for urging the movable tooth outwardly.

4. The herein described traction wheel having an opening through its rim, a tooth fixed to the rim juxtaposed the opening, a second tooth movable along the face of the first tooth, a bell crank lever having one arm secured to the second tooth and extended through said opening, a bar having one end pivotally connected with the inner periphery of the rim and its other end pivoted to the bell crank lever near its apex, and means for yieldingly urging the second tooth outwardly of the wheel rim.

5. The herein described traction wheel having an opening through its rim, a tooth fixed to the rim juxtaposed the opening, a second tooth movable along the face of the first tooth, a bell crank lever having one arm secured to the second tooth and extended through said opening, a bar having one end pivotally connected with the inner periphery of the rim and its other end pivoted to the bell crank lever near its apex, and spring means engaging the free end of said bell crank lever for yieldingly urging the second tooth outwardly of the wheel rim.

6. The herein described traction wheel having an opening through its rim, a tooth fixed to the rim juxtaposed the opening, a second tooth movable along the face of the first tooth, a bell crank lever having one arm secured to the second tooth and extended through said opening, a bar having one end pivotally connected with the inner periphery of the rim and its other end pivoted to the bell crank lever near its apex, and spring means engaging the free end of said bell crank lever and the pivot of said bar connecting the same with the rim, said spring means yieldingly urging the second tooth outwardly at all times.

7. The herein described traction wheel having an opening through its rim, a tooth fixed to the rim juxtaposed the opening, a second tooth movable along the face of the first tooth, a bell crank lever having one arm secured to the second tooth and extended through said opening, a bar having one end pivotally connected with the inner periphery of the rim and its other end pivoted to the bell crank lever near its apex, means on the free end of said bell crank lever for engaging said bar when the second tooth is at its outer limit of movement, and means urging said second tooth to its outer limit of movement.

8. The herein described traction wheel having an opening through its rim, a tooth fixed to the rim juxtaposed the opening, a second tooth movable along the face of the first tooth, a bell crank lever having one arm secured to the second tooth and extended through said opening, a third tooth spaced from said opening and fixed to the rim, an eye-bolt passing through said third tooth and rim, a bar having one end pivoted to said eye-bolt and its other end pivoted to the apex of said bell crank lever, and a spring member having its intermediate portion engaging the pivot between said eye-bolt and said bar and its ends engaging the free end of the bell crank lever and a portion of the rim.

9. The herein described traction wheel having an opening through its rim, a tooth fixed to the rim juxtaposed the opening, a second tooth movable along the face of the first tooth, a bell crank lever having one arm secured to the second tooth and extended through said opening, a third tooth spaced from said opening and fixed to the rim, an eye-bolt passing through said third tooth and rim, a bar having one end pivoted to said eye-bolt and its other end pivoted to the apex of said bell crank lever, a spring member having its medial portion coiled about the pivot between the bar and the eye-bolt and having one end impinging against the free end of said bell crank lever and its other end impinging against the rim, and means on the free end of the bell crank lever for abutting against the bar when the second tooth is at its outer limit of movement.

In testimony whereof I affix my signature.

FRANK M. HEINIG.